United States Patent [19]

Jacquet

[11] 4,347,088

[45] Aug. 31, 1982

[54] BUBBLE TUBES FOR SPIRIT LEVELS

[75] Inventor: Daniel Jacquet, Mulhouse, France

[73] Assignee: Stanley Mabo S.A., Besancon, France

[21] Appl. No.: 216,089

[22] Filed: Dec. 15, 1980

[30] Foreign Application Priority Data

Dec. 13, 1979 [FR] France ................. 79 31027

[51] Int. Cl.³ ............... B29C 27/08; G01C 9/26
[52] U.S. Cl. .................... 156/69; 33/379;
33/389; 156/73.1; 156/146; 156/153; 156/245; 156/294
[58] Field of Search ............. 156/73.1, 69, 145, 146, 156/153, 245, 294; 33/389, 379

[56] References Cited

U.S. PATENT DOCUMENTS

| 3,583,073 | 6/1971 | Balint | 33/379 |
| 3,593,428 | 7/1971 | Jacoff | 33/379 |
| 3,842,514 | 10/1974 | Scheyer | 33/379 |
| 3,871,109 | 3/1975 | Vaida | 33/379 |

*Primary Examiner*—Michael G. Wityshyn
*Attorney, Agent, or Firm*—Prutzman, Kalb, Chilton & Alix

[57] ABSTRACT

A method for manufacturing a bubble tube for a bubble level, comprising the following stages:

completely filling a barrel-shaped machined cavity (9) in the tube with suitable liquid such that the entire hollow part of the bubble tube is full;

positioning a plug (14), comprising a cavity of which the precisely determined inner shape corresponds to the required bubble volume, into the seat (13);

joining the plug to the body of the bubble tube.

Application: to the precision-manufacture of bubble tubes by mass production.

3 Claims, 6 Drawing Figures

BUBBLE TUBES FOR SPIRIT LEVELS

The present invention relates to an improved method for manufacturing bubble tubes for spirit levels, particularly by mass production.

The construction of the bubble tubes fitted to levels for measuring horizontality or verticality is a well known industrial operation. However, although the methods at present used are satisfactory with regard to accuracy, they do not allow semi-automatic or automatic mass production while at the same time maintaining this accuracy.

In this respect, sources of inaccuracy arise in all existing methods, and in particular in the case of a cylindrical bubble tube of which the inner cavity is in the form of a barrel.

Thus, if the bubble tube is entirely injection-moulded, its inner volume is only approximately constant within the same series, due to problems inherent in the injection method and in the barrel shape of the inner cavity. It is still necessary to machine the grooves for receiving the reference segments, and these then have to be centered relative to the barrel shape, this being a delicate operation.

If however the bubble tube is produced by machining, it is difficult to obtain a constant bubble size, because the liquid is metered by means of a pipette, i.e. a manual operation, which is long, tedious and inaccurate.

Even if the precision of the body of the level on which the bubble tube is mounted, and the shape, outer dimensions and positioning of the cylindrical bubble tube on said body of the level can be controlled during mass production to the best possible degree, it is still essential for this precision to be equally reflected in the bubble tube itself, and this is not the case in the actual state of the art.

The object of the present invention is to obviate these drawbacks by proposing a method for the manufacture of a cylindrical bubble tube for a spirit level, comprising an inner barrel-shaped cavity having the same axis as the bubble tube, characterized in that said cavity is completely filled with a suitable liquid, the bubble tube then being closed by a plug, which has its hollow inner form precisely determined so as to give the bubble a determined volume, the plug being joined to the bubble tube in a sealed manner.

According to a preferred embodiment, the bubble tube is machined starting from a cylindrical preform produced by injection-moulding, the machining enabling the inner barrel-shaped cavity and the grooves for receiving the reference segments to be constructed with precision.

With the preferred method according to the invention, the inner shape is in actual fact produced starting from the outer cylinder, the dimensions of which are precisely obtained, so guaranteeing all the factors necessary for the accuracy of the bubble tube and the accuracy of its mounting on the body of the level.

According to the invention, the barrel-shaped inner cavity is preferably totally machined starting from the preform, together with the grooves intend to receive the reference segments, which are in practice circlips. In this case, there is no problem of centering said grooves.

To ensure that the segments are positioned precisely at the bottom of the grooves which receive them, so that they form no projection on which the bubble can become halted, the grooves according to the invention are preferably of semi-trapezoidal section.

By assembling a precisely sized plug according to the invention, a precisely determined bubble length is obtained between the two reference marks. In this case, it is not necessary to feed a determined quantity of liquid.

Finally, according to a preferred embodiment of the invention, the plug is joined to the body of the bubble tube by ultrasonic welding, the body of the bubble tube and the plug being machined from materials which are compatible with welding.

This is done by applying a sonotrode to the outer face of the plug opposite the cavity in the bubble tone.

The precise sizing of the plug is very important here, in that the gap between the plug and its seat in the body of the bubble tube which receives it must on the one hand allow evacuation of gas and surplus liquid, and on the other hand allow welding between the plug and the seat walls, i.e. a gap which is compatible with the required strength of the body of the bubble tube at said weld.

The invention will be more apparent from the description given hereinafter of a preferred embodiment of the invention with reference to the accompanying drawings in which.

A bubble tube is disposed in known manner in a level 1, for example moulded or extruded, comprising a body 2 and a base-plate 3.

The bubble tube can be disposed vertically or horizontally, and the corresponding seats 4 and 5 are machined in the body of the level in equally known manner.

Figure 1:
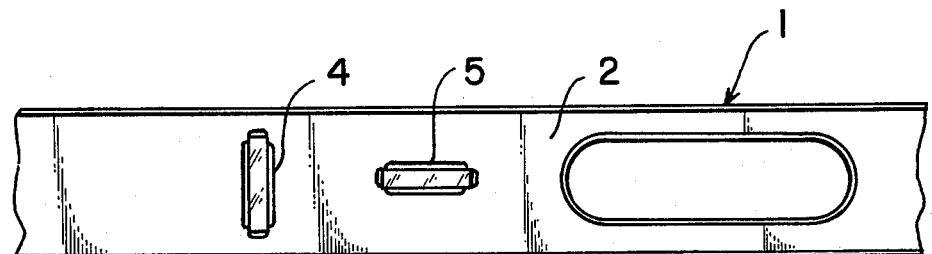
FIG. 1 is a plan view of the body of a level comprising two seats for bubble tubes.
Figure 2:
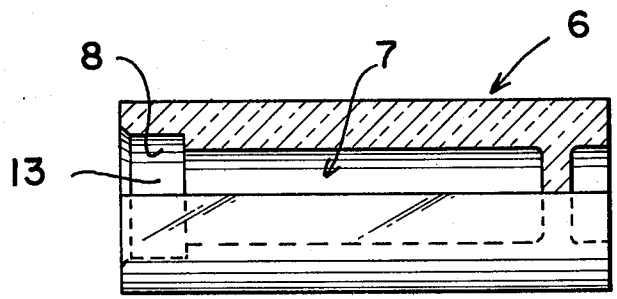
FIG. 2 is a section through a preform as obtained by injection-moulding.

FIG. 2 is a section through a preform 6 obtained by injection-moulding. This preform is cylindrical, and comprises a cylindrical inner cavity 7 which terminates at its open end in a recess 8 of larger diameter.

According to the invention, the cavity 7 of the preform 6 is precision-machined to provide a barrel-shaped cavity 9, the axis of which coincides with that of the outer cylinder.

Figures 3, 3A, 3B:
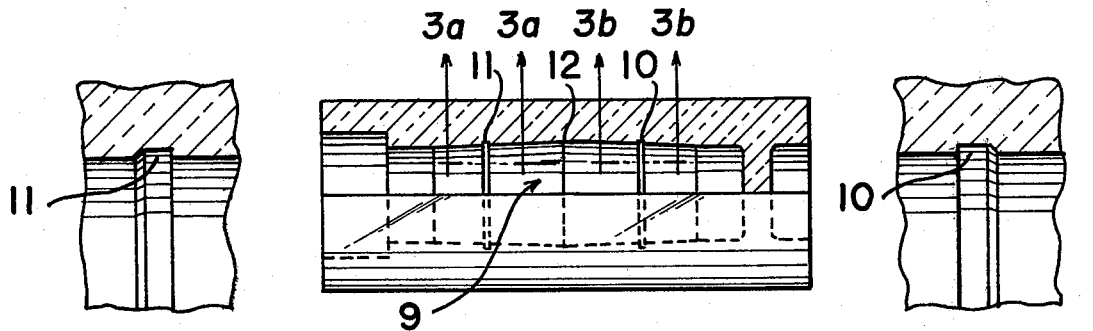
FIG. 3 is a longitudinal section through a bubble tube body prepared by the preferred method according to the invention.
FIGS. 3a and 3b are enlarged partial views showing details of FIG. 3.

Two seats 10, 11 having a semi-trapezoidal profile in cross-section (see FIGS. 3a and 3b) are also machined in said cavity, and are disposed symmetrically about a plane passing through the central ridge 12 of the barrel.

Figure 4:
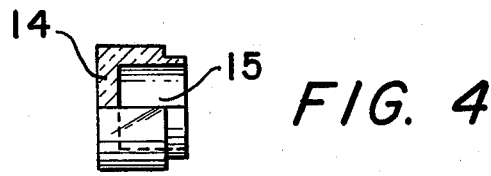
FIG. 4 is a longitudinal section through a precisely sized plug for carrying out the method of the invention.

The preform 6 finally comprises a seat 13 in which a plug 14 shown in FIG. 4 is positioned. This plug is obtained by moulding or machining, and has a precisely determined hollow inner form 15.

Assembly according to the invention is as follows:

The barrel-shaped machined cavity 9 is completely filled with a suitable liquid such that the entire hollow part of the bubble tube is full, The plug 14 is positioned in the seat 13, The plug is joined to the body of the bubble tube.

The joint can be made in known manner by cementing or by ultrasonic welding.

I claim:

1. A method for manufacturing a cylindrical bubble tube for a spirit level, including the steps of providing a tubular hollow body with a closed end and an open end and an inner barrel-shaped cavity having the same axis as the bubble tube, substantially filling said hollow body with a suitable liquid, inserting a hollow plug having an inner cavity of a precisely determined volume to close the open end of the tubular body and spill some of the liquid therefrom, the volume of the cavity of said plug being equal to the desired volume of the air bubble in said bubble tube, and sealing the plug in the open end of the hollow body.

2. A method as claimed in claim 1, including the step of forming a pair of axially spaced referenced grooves in said barrel shaped cavity.

3. A method as claimed in claim 1 characterized in that the plug is sealed to the bubble tube by ultrasonic welding.

* * * * *